June 27, 1967
K. W. HALLDEN
3,327,578
FLYING SHEAR PROVIDING FOR MULTIPLE MINIMUM CUT-LENGTHS
AND FURTHER VARIABLE CUT-LENGTHS
Filed Aug. 4, 1965
4 Sheets-Sheet 1
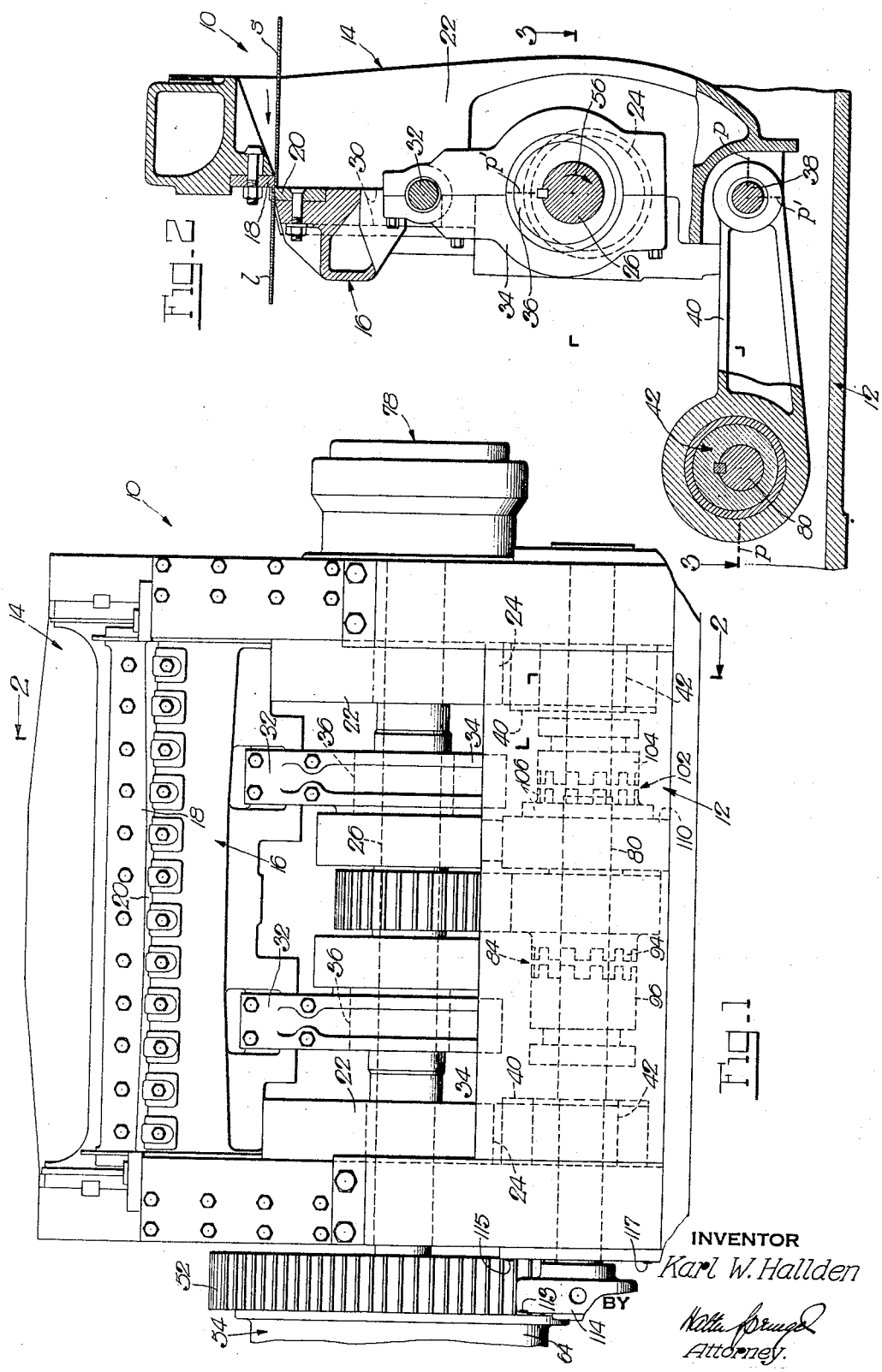
INVENTOR
Karl W. Hallden
BY
Attorney.

June 27, 1967  K. W. HALLDEN  3,327,578
FLYING SHEAR PROVIDING FOR MULTIPLE MINIMUM CUT-LENGTHS
AND FURTHER VARIABLE CUT-LENGTHS
Filed Aug. 4, 1965  4 Sheets-Sheet 2

INVENTOR
Karl W. Hallden
BY
Attorney.

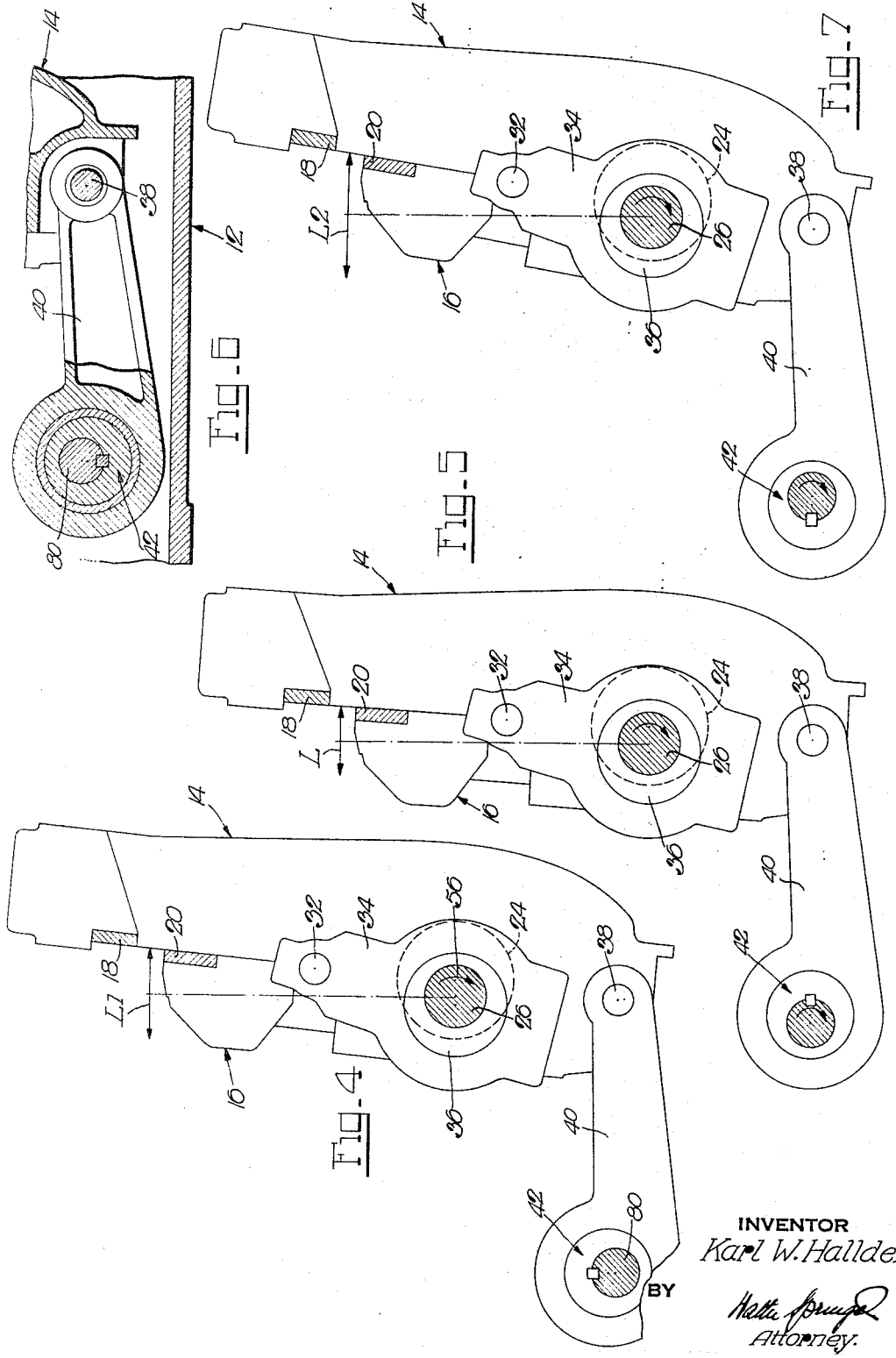

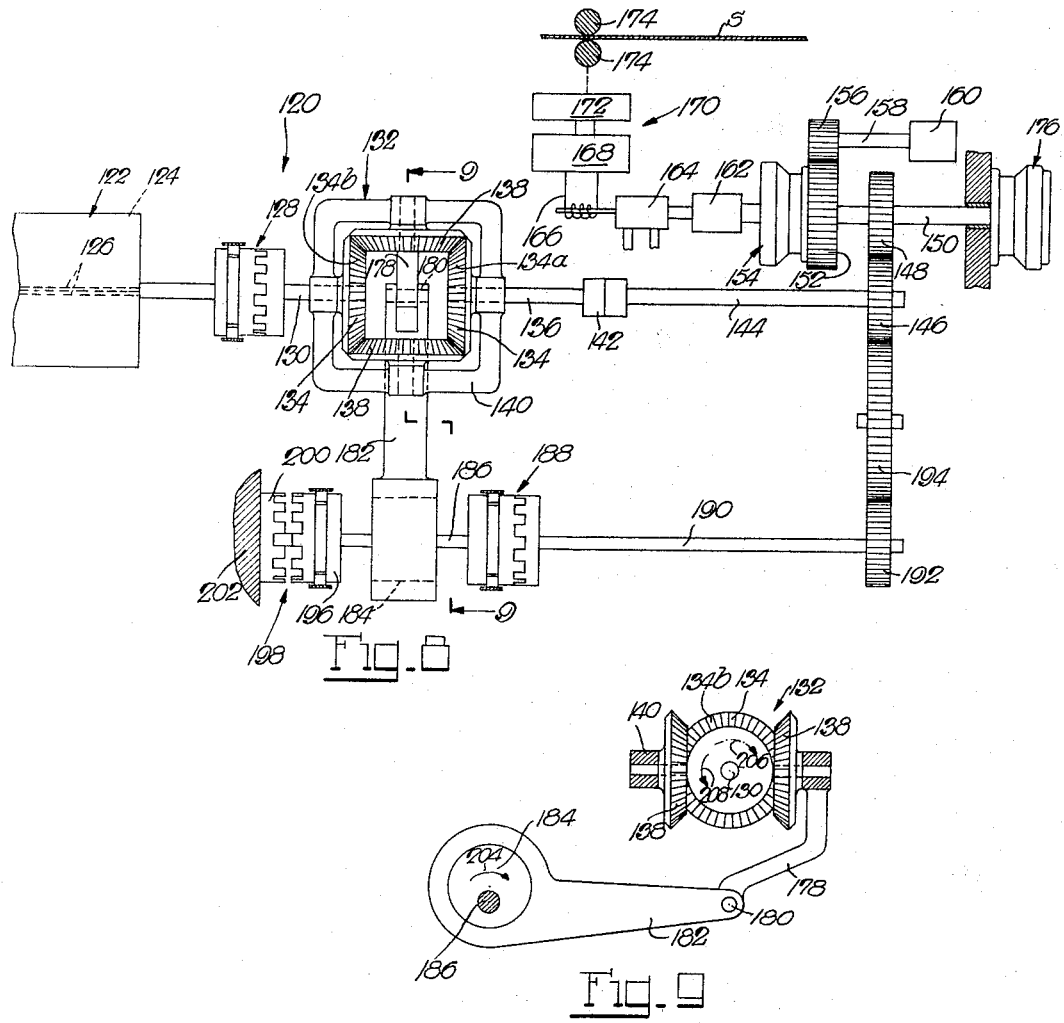

United States Patent Office 3,327,578
Patented June 27, 1967

3,327,578
FLYING SHEAR PROVIDING FOR MULTIPLE MINIMUM CUT-LENGTHS AND FURTHER VARIABLE CUT-LENGTHS
Karl W. Hallden, Thomaston, Conn., assignor to The Hallden Machine Company, Thomaston, Conn., a corporation of Connecticut
Filed Aug. 4, 1965, Ser. No. 477,139
11 Claims. (Cl. 83—287)

This invention relates to stock cutting apparatus in general, and to apparatus for cutting stock in continuous motion in particular.

The present invention is concerned with flying shears of which the companion shear blades travel with the stock to-be-cut just prior to and during each severance of the latter by the blades. One type of such shear is characterized in that the companion shear blades are carried by a shear frame and a shear gate, respectively, of which the latter is guided on the former for movement with its blade into and from shearing relation with the other blade, the frame and gate being operatively connected with power-driven coaxial eccentrics, respectively, which cooperate to bring the blades into shearing relation with each other at recurring intervals. This shear is further characterized in that the shear frame is also oscillated back and forth longitudinally of the fed stock, with the shear gate following the shear frame on its oscillations for their synchronous movement with the stock at the times of cut.

There have also become known simplified low-cost flying shears which are adequate for many stock cutting requirements, and which at a given uniform operating speed cut stock fed at a uniform rate into infinitely variable lengths starting from a set minimum length. These simplified shears have a clutch and brake, of which the clutch, when engaged operates the shear and the brake stops the shear when at any concluded cutting cycle the clutch is disengaged, and an electronic control system for the clutch with a register which is presettable to cause periodic engagement of the clutch for single operating cycles of the shear to cut stock of any preset length above the set minimum length, or to cause engagement of the clutch and retain it in engagement for repeat operating cycles of the shear to cut the stock into the set minimum lengths. Thus, for all cuts above the set minimum length the shear remains idle until the continuously fed stock travels a distance substantially equal to the cut-length for which the register of the electronic control is set, whereupon the latter causes clutch engagement for a single operating cycle of the shear to cut the exact preset stock length. As long as the shear is under active electronic control, it will thus perform in accordance with the same or different cut-lengths above the set minimum length for which the register is set, or it will uninterruptedly repeat cutting cycles if the register is set for minimum cut-lengths. The electronic control is usually of pulse-counting type which readily lends itself to manual, tape, card or remotely controlled programming of its presetting register. These simplified flying shears perform entirely satisfactorily, except that their advantage of the great range within which stock lengths of infinite variations may be cut is at the expense of the cutting rate which drops with increasing cut-lengths. Thus, while the cut rate of such a shear may, at the prevailing cut-cycle duration of the latter and at the therewith coordinated invariable feed rate of the stock, be at an entirely satisfactory optimum when cutting stock at or in the neighborhood of the set minimum length, the cut rate will in any event drop proportionately with increasing cut-lengths and, hence, become particularly low at cut-lengths which are considerably larger than the minimum cut-length.

It is an object of the present invention to provide a flying shear of electronically controlled type which has simple provisions for selectively cutting stock at either of a plurality of relatively widely different minimum lengths without requiring, for synchronous movement of the shear blades and stock at the times of cut of any length, any change in the cut-cycle duration of the shear and, hence, in its uniform drive to that end. With this arrangement, the feed rate of the stock will vary with, and as widely as, the different minimum lengths of cut, and for any desired cut length the shear is set for the nearest minimum cut-length therebelow, whereby the aforementioned sharp drop in the cut rate of the prior simplified shears with increasing cut-lengths is greatly reduced.

It is another object of the present invention to provide a shear of electronically controlled type which has the described characteristics of one flying shear, and in which the aforementioned different minimum cut-lengths are achieved by predetermined variations of the amplitude of oscillation of the shear frame and gate without, however, changing the duration of each oscillation. With this arrangement, the shear frame and gate will move faster and slower at increased and decreased amplitudes of oscillation, respectively, and thus require higher and lower feed rates, respectively, of the stock in order that the latter may move in synchronism with the shear blades at the times of cut.

It is a further object of the present invention to provide a simplified electronically-controlled shear in which the aforementioned variations of the amplitude of oscillation of the shear frame and gate are achieved by means of an auxiliary eccentric and a follower arm thereon, of which the eccentric is driven at a one-to-one ratio with the operating eccentrics and is adjustable into either of two positions 180 degrees apart, and the follower arm is connected with the shear frame to serve as a floating pivot for the latter. With this arrangement, the operating eccentric of the shear frame imparts primary oscillations to the latter about its floating pivot, while the auxiliary eccentric simultaneously imparts to the shear frame secondary oscillations about its operating eccentric which are superimposed on its primary oscillations and are either additive to or subtractive from the latter, depending on the adjusted position of the auxiliary eccentric. Thus, with the adjustable positions of the auxiliary eccentric being so selected that the latter will impart to the shear frame superimposed additive or subtractive oscillations of maximum amplitude, the shear provides for two minimum cut-lengths which differ from each other to the maximum extent, with ensuing equal maximum differences in the feed rates of the stock for the respective minimum cut-lengths.

Another object of the present invention is to provide an electronically-controlled shear in which is added to the aforementioned two different minimum cut-lengths a third minimum cut-length intermediate the other two, by making provisions for releasably locking the aforementioned auxiliary eccentric against rotation in either of its adjustable positions. With this provision, the efficiency and flexibility of the shear is further increased for the smaller lengths of cut below the largest minimum cut-length.

A further object of the present invention is to provide an electronically-controlled shear in which the aforementioned adjustability, drive and lock against drive, of the auxiliary eccentric is achieved by the simple expediency of providing a shaft counter to the main shaft which carries the operating eccentrics, and mounting the auxiliary eccentric on the counter shaft, and by suitable clutch means either connect the counter shaft with a one-to-one ratio gear drive from the main shaft or with a stationary part of the shear, or disconnect the counter shaft from this drive and stationary shear part for adjustment of the auxiliary eccentric.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a fragmentary front view of a flying shear embodying the present invention;

FIG. 2 is a fragmentary section through the shear taken substantially on the line 2—2 of FIG. 1;

FIGS. 4 and 5 are diagrammatic views, partly in section, of a main component of the shear in different operating conditions;

FIG. 6 is a fragmentary section through part of the shear in an adjusted position different from that of FIG. 2;

FIG. 7 is a diagrammatic view, partly in section, of the same shear component as in FIGS. 4 and 5, but in still another different operating condition;

FIG. 8 is a diagrammatic view of a different flying shear embodying the present invention; and FIG. 9 is a section taken substantially on the line 9—9 of FIG. 8.

Figure 3:
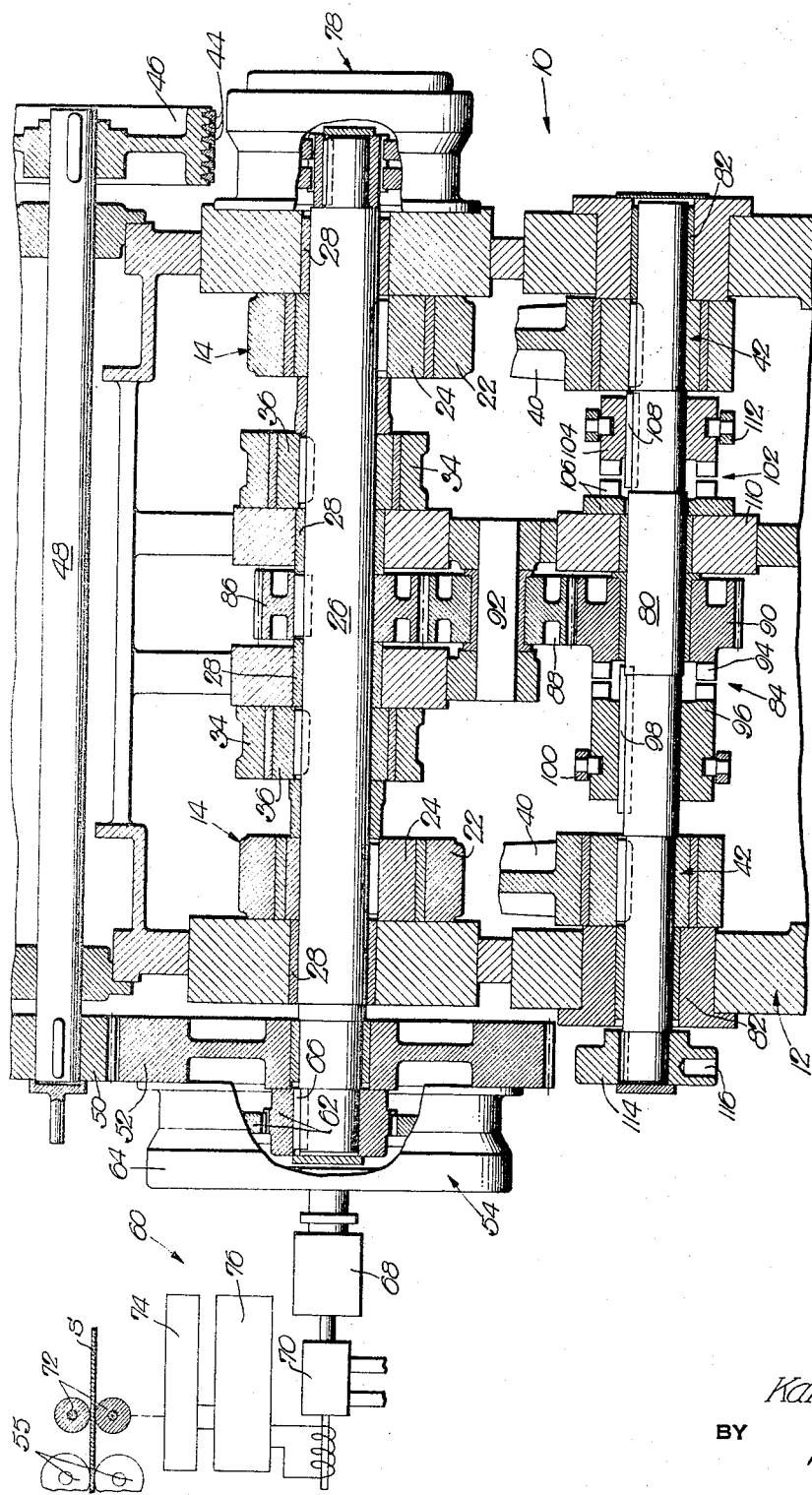
FIG. 3 is a fragmentary section through the shear taken substantially on the line 3—3 of FIG. 2.

Referring to the drawings, and more particularly to FIGS. 1 to 3 thereof, the reference numeral 10 designates a flying shear of guillotine-type, having a base 12, a shear frame 14 and a shear gate 16 carrying companion shear blades 18 and 20, respectively.

The shear frame 14, which is of usual inverted U-shape, is with its legs 22 turnably supported on spaced operating eccentrics 24 on a main shaft 26 which is journalled in bearings 28 in the base 12. The shear frame 14 provides ways 30 in which the shear gate 16 is guided for movement with its blade 20 into and from shearing relation with its companion blade 18 on the shear frame (FIG. 2). For operational movement of the shear gate 16 with its blade 20 toward and away from the other blade 18, the shear gate is at 32 pivotally connected with follower straps 34 on spaced operating eccentrics 36 on the main shaft 26, while operational movement of the shear frame 14 with its blade 18 toward and away from the other blade 20 is derived from the operating eccentrics 24 on the same shaft 26, with the eccentrics 24 and 36 being displaced 180 degrees from each other as shown (FIG. 2) for correct cycle operation. For operational movement of the shear blades 18, 20 in synchronism with the continuously fed stock $s$ at the times of cut, the shear frame 14 and with it the shear gate 16 are oscillated back-and-forth along the moving stock by the operating eccentrics 24. To this end, the shear frame 14 is at 38 pivotally connected with spaced arms 40 on pivot members 42, whereby the pivot connections 38 of the shear frame 14 with the arms 40 serve as pivots of up-and-down floatability about which the shear frame and the shear gate thereon will be rocked back-and-forth by the frame eccentrics 24 on their power drive.

For the drive of the shear, there is provided a suitable prime mover, usually a variable-speed motor (not shown), which through belts 44 drives a pulley 46 on a shaft 48 (FIG. 3) that also carries a pinion 50 which is in mesh with a gear 52. The gear 52 is loose on the main shaft 26, but is connectible therewith by a clutch 54 to be described in somewhat greater detail hereinafter.

Stock $s$, which may be metal sheet, for example, is continuously fed to the shear by suitable power-operated feed mechanism exemplified by power-driven rolls 55 (FIG. 3).

In operation of the shear, and assuming that the main shaft 26 is driven in clockwise direction as indicated by the arrows 56 in FIGS. 2 and 4, the shear will have an operating cycle during each revolution of the main shaft 26. Thus, with the frame and gate eccentrics 24 and 36 being at the start of each cut cycle in a "cycle start" position displaced 180 degrees from their "cut" position shown in FIG. 2, it follows that at the start of a cycle the shear frame and gate 14, 16 are in the same angular position relative to the main shaft as in FIG. 2, and the blades 18 and 20 are at their maximum separation. These blades 18 and 20 are moved toward and into shearing relation with the fed stock $s$ on the first half revolution of the eccentrics 24, 36 clockwise from their described cycle start position, as will be readily understood. Also, the shear frame 14 and gate 16 thereon will, on this first half-revolution of the eccentrics 24 and 36, be rocked by the frame eccentrics 24, about the frame's floating pivot connections 38 with the arms 40, first to the right from the described angular start position and then to the left into the "cut" position shown in FIG. 2 in which the blades 18, 20 not only move in synchronism with the fed stock $s$ but also cut a length $l$ from the stock. As the operating eccentrics 24, 36 pass through their second half-revolution back into their described cycle start position, the blades 18, 20 will separate and the shear frame 14 and gate 16 thereon will be rocked by the frame eccentrics 24 first in continuing direction to the left from the cut position in FIG. 2 and then in opposite direction to the mentioned start position. Hence, the shear frame 14 and gate 16 thereon have during each cut cycle of the shear compound motion, namely, opposed reciprocation once for closing and opening the blades 18, 20 and joint oscillation once back-and-forth of the moving stock. The blades 18 and 20 on the shear frame 14 and gate 16 thus travel in operation in orbital paths as is typical in flying shears of guillotine type.

Cycle control over the shear is exercised in this instance by a control device 60 which is presettable for a multitude of different cut-lengths $l$ and which electronically measures the advance of the leading end of the uniformly fed stock beyond the shear and initiates a shear cycle at such time that the blades 18, 20 will cut the precise stock length for which the control device is preset just when the shear frame and gate 14, 16 pass through the cut position in FIG. 2. Thus, a shear cycle is initiated on engagement of the earlier mentioned clutch 54 by the control device 60, with this clutch being in this instance of pneumatic type (FIG. 3) and having companion members 62 and 64 of which the driven member 62 is at 66 keyed to the main shaft 26 and the driving member 64 turns with the gear 52 and, hence, is continuously driven on the power drive of the shear. The pneumatic clutch 54 may be entirely conventional and, hence, requires no further description, the same becoming engaged on admission of compressed air through a rotary fitting 68 and under the control of a solenoid valve 70, and becoming disengaged on being vented under the control of the same valve 70.

The control device 60 includes pinch rolls 72 which have rolling contact with the fed stock $s$, and one of which drives a transducer 74 (FIG. 3) to generate an electric impulse for each minute fraction of a revolution of this roll, with these impulses being counted by an electronic counter and control 76 of which the control has a presetting register. It is the control 76 which determines the advance of the leading end of the stock beyond the shear to the extent at which on initiation of a shear cycle by the control device 60 the shear will cut the precise stock length for which the register is set. The register of the control 76 is presettable for virtually infinitely variable cut-lengths within a wide range, and the same may be preset either manually, or by tape or card, or even by remote control. The electronic counter and control 76 is a conventional instrumentality and forms no part of the present invention. The operation of this counter and control 76 is such that upon the advance of the leading end of the stock beyond the shear to the extent necessary for cut-off of the exact stock length for which the register is preset, an output circuit from the control 76 is energized to operate the solenoid valve 70 and thereby admit compressed air to the clutch 54 for its engagement and ensuing operating cycle of the shear. Included in the control 76 are suitable interlocking circuits (not shown) to deenergize valve 70 at the end of one revolution of the main shaft 26, i.e., at the end of a shear cycle to thereby terminate the latter.

Also associated with the main shaft 26 is a conventional pneumatic brake 78 (FIG. 3) having inherent control means (not shown) to stop the main shaft in the correct cycle start position of the operating eccentrics 24 and 36 at the end of each shear cycle, unless the register of the control 76 is set for cutting stock at minimum cut-lengths for which the shear cycles are repetitive without pause.

It follows from the cut position of the shear in FIG. 2 that the speed of the blades 18, 20 in stock-following direction is then at a maximum, owing to the then momentary position of the frame eccentrics 24 in which their largest radii are in alignment with the pivot connections 38 of the shear frame 14 with the arms 40. Accordingly, it is at this maximum speed of the blades 18, 20 in stock-following direction at which they must be in synchronism with the stock s for a smooth cut action thereon and without buckling or marring the stock. Accordingly, the feed rate of the stock is set so as to be equal to this maximum speed of the blades 18 and 20 or, conversely, the operating speed of the shear, i.e., of its main shaft 26, is set so that the maximum speed of the blades 18, 20 in stock-following direction is equal to a given feed rate of the stock.

The present shear may thus be operated to cut stock into cut-lengths which may vary from an upper limit, imposed by the control device 60, downwardly virtually infinitely to a minimum cut-length of which the shear is capable and which is achieved on setting the register of the control 76 for repeat cut cycles without pause, as will be readily understood. The actual minimum cut length is, of course, equal to the advance of the fed stock between successive uninterrupted cut actions of the blades 18 and 20.

If desired, the shear may be operated at a single set speed for optimum simplicity and minimum cost of the shear, in which case the feed mechanism 55 may also be operated at a single set speed. However, regardless of whether the shear is operable at a single speed or at some variable speed such as is applicable by a fairly inexpensive variable-speed motor drive, for example, provisions are made, according to the present invention, to operate the shear advantageously for a number of different minimum cut-lengths in addition to the minimum cut-length already described, with a different feed rate of the stock being required for each minimum cut-length. Thus, with the operating speed of the shear being either invariable or variable within the limits imposed by a variable-speed drive motor, i.e., with the duration of each cut cycle being either invariable or variable, the stock feed rate for the largest minimum cut-length and any other cut-length therebeyond is proportionately higher than the stock feed rate for the smallest minimum cut-length and any cut-length between the latter and the largest minimum cut-length, as will be readily understood. The different minimum cut-lengths thus afford a fair range of different stock feed rates of which the highest one applicable for any desired cut-length is selected, thereby quite appreciably increasing the efficiency of the shear in operation for all cut-lengths.

To the end of operating the shear at the aforementioned different minimum cut-lengths, the described pivot members 42 for the arms 40 are in the form of eccentrics on a counter shaft 80 which may be driven from the main shaft 26. Shaft 80, which is journalled in suitable bearings 82 in the base 12 (FIG. 3), is drivingly connectible with the main shaft 26 through a clutch 84 and meshing gears 86, 88 and 90, of which gear 86 is mounted on the main shaft 26, gear 88 is mounted on a suitably journalled shaft 92 in the base 12, and gear 90 is freely turnable on the counter shaft 80. The clutch 84 has companion driving and driven members 94 and 96 of which the driving member 94 is in this instance formed integrally with the gear 90 and the driven member 96 is at 98 splined to the shaft 80. There is also provided a shifter fork 100 for engaging and disengaging the clutch 84. Thus, on engaging the clutch 84, the counter shaft 80, and with it the eccentrics 42 thereon, will be driven from the main shaft 26 in the same direction as the latter, and also at a one-to-one ratio because the gears 86 and 90 are of identical size.

Assuming now that the shear is in idle condition in which the shear frame and gate 14, 16 are in the described cycle start position in which the eccentrics 42 are in the position in FIG. 2, these eccentrics may then be drivingly connected with the main shaft 26 on simply engaging the clutch 84. On subsequently operating the shear through a cut-cycle, the shear frame and gate 14, 16 will on the first half-revolution of the operating eccentrics 24, 36 be oscillated by the frame eccentrics 24 first to the right and then to the left into the cut position in FIG. 2. However, on the same drive of the eccentrics 42 through the first half-revolution, the latter will, through the arms 40, also oscillate the shear frame and gate 14, 16 about the operating eccentrics 24, first to the right and then to the left in FIG. 2, wherefore the oscillation imparted to the frame and gate by the eccentrics 42 is superimposed upon the oscillation imparted to them by the other eccentrics 24 and is in this instance subtractive from the latter oscillation. As the shear frame and gate 14, 16 pass through the cut position they are in the same angular position as in FIG. 2 even though the now driven eccentrics 42 are then displaced 180 degrees from the position shown. During the second half-revolution of the eccentrics 24 and 42 the respective oscillations imparted by them to the shear frame and gate 14, 16 are again subtractive. The amplitude of oscillation of the shear frame and gate is indicated at L in FIG. 5 in which the shear frame and gate are shown in the momentary position on completion of the first quarter revolution of the eccentrics 24 and 42. Thus, with the eccentrics 42 now driven as described, the shear frame and gate 14, 16 will during each cut cycle undergo a single back-and-forth oscillation of the amplitude L (FIG. 5). FIG. 4 shows the amplitude of oscillation L1 of the shear frame and gate 14, 16 during each cut cycle in the operation of the shear when the eccentrics 42 are not driven, i.e., when the clutch 84 is disengaged and the eccentrics 42 arrested against rotation in their position in FIGS. 2 and 4 in a manner to be described. The appreciable difference in the amplitude of oscillation of the shear frame and gate 14, 16 when the eccentrics 42 are driven and held stationary, respectively, is thus quite apparent from the indicated amplitudes L and L1 in FIGS. 5 and 4. Considering now that at exemplary invariable operating speed of the shear the single back-and-forth oscillation of the shear frame and gate per cut in FIGS. 4 and 5 are exactly of the same duration, it stands to reason that the oscillatory speed of the shear frame and gate, including maximum speed at the times of cut, is greater in the shear condition of FIG. 4 than in the shear condition in FIG. 5, and that these speeds vary proportionately as the indicated oscillation amplitudes L and L1. Hence, in order to achieve synchronous movement of the stock with the shear blades 18, 20 at the times of cut, the feed rates of the stock in the shear operations of FIGS. 4 and 5 must differ proportionately as L1 and L, respectively. Further, the minimum cut-lengths obtainable in the respective shear operations of FIGS. 4 and 5 vary proportionately as the indicated oscillation amplitudes L1 and L, with the shear operation of FIG. 5 providing for the smaller minimum cut-length. Thus, while it is imperative that the shear be conditioned for operation according to FIG. 5 for any cut-length from the minimum cut-length indicated therefor to just short of the described larger minimum cut-length possible in the shear operation according to FIG. 4, it is of obvious advantage to speed up the stock feed for any greater cut-lengths by resorting to the shear operation according to FIG. 4.

The aforementioned arrest against rotation of the eccentrics 42 in the shear operation according to FIG. 4 is achieved in this instance by another clutch 102 having companion members 104 and 106, of which member 104 is at 108 splined to the counter shaft 80, while the other member 106 is immovably mounted on a fixed part 110 of the base 12 (FIG. 3). The clutch member 104 may by a shifter fork 112 be brought into and from engagement with the fixed member 106 to lock shaft 108 and therewith the eccentrics 42 against, and release them for, rotation, respectively.

The other additional minimum cut-length is achieved in the shear operation according to FIG. 7. For that shear operation, the eccentrics 42 are, in idle condition of the shear and during disengagement of the clutches 84 and 102, angularly adjusted into the position shown in FIG. 6 in which they are displaced 180 degrees from the other described position in FIG. 2, whereupon the clutch 84 is reengaged. In thus adjusting the eccentrics 42 for their operational drive according to FIG. 7, it will be apparent that the oscillations imparted to the shear frame and gate 14, 16 are additive, with their resulting oscillation per cut cycle being of the indicated amplitude L2 which among the possible amplitudes of oscillation is the largest and affords the largest minimum cut-length and the highest feed rate of the stock at which all cut-lengths from this largest minimum cut-length on upwards are advantageously undertaken.

For ready adjustment of the eccentrics 42 into either of the positions in FIGS. 2 and 6, the counter shaft 80 extends beyond one side of the base 12 and there carries a disc 114 with suitable apertures 116 for receiving a bar or other tool with which to turn the counter shaft 80. Also, for accurate adjustment of the eccentrics 42 in either of the positions in FIGS. 2 and 6, the disc 114 is preferably provided with a marker or pointer 113 which in said eccentric positions is in line with markers 115 and 117, respectively, on the shear base 12 (FIG. 1).

In order to achieve an advantageous maximum spread between the smallest and largest minimum cut-lengths in the respective shear operations of FIGS. 5 and 7, both of the two adjustment positions of the eccentrics 42 are preferably so selected that they extend in either position with their largest radii parallel to the largest radii of the frame operating eccentrics 24 in their described cycle start position. These preferred adjustment positions of the eccentrics 42 are shown in FIGS. 2 and 6. Also, in order that the shear frame and gate 14, 16 will at the times of cut extend with their blades 18 and 20 advantageously normal to the passing stock (FIG. 2) in either of the shear operations according to FIGS. 4, 5 and 7, the axes of the eccentrics 42 and of the pivot connections 38 of the arms 40 with the shear frame 14 lie in a plane $p$ which extends normal to the plane $p'$ in which the axes of the pivot connections 38 and of the main shaft 26 lie when the operating eccentrics 24 and 36 are in the cut position shown in FIG. 2.

Reference is now had to FIG. 8 which shows an electronically controlled rotary shear 120 that also embodies the present invention. This shear has companion shear drums 122 and 124 which are drivingly connected at a one-to-one ratio and carry companion shear blades 126. Drum 122 is through a clutch 128 connectible with and disconnectible from the output shaft 130 of a planetary differential 132 having sun gears 134 on the output and input shafts 130 and 136 of the differential, and planetary gears 138 in a casing 140 which is turnable on the shafts 130 and 136. The input shaft 136 of the differential 132 is through a coupling 142 connected with a shaft 144 carrying a gear 146 which is in mesh with another gear 148 on a main drive shaft 150. Freely turnable on the main shaft 150 is another gear 152 which through a pneumatic clutch 154 is connectible with and disconnectible from this main shaft 150. Gear 152 is in permanent mesh with a pinion 156 on the output shaft 158 of a suitable prime mover, such as an electric motor 160, for example. The pneumatic clutch 154 is supplied with air for clutch engagement, and vented for clutch disengagement, through a rotary fitting 162 under the control of a solenoid valve 164 which, in turn, is controlled by an output circuit 166 from the counter and control 168 of an electronic control device 170. This device 170 also includes a transducer 172 which is driven from one of the pinch rolls 174 that are in rolling contact with the continuously fed stock $s$. Also associated with the main shaft 150 is a pneumatic brake 176. The control device 170 and pneumatic brake 176 perform in the same manner as the control device 60 and pneumatic brake 78 of the described shear 10 (FIG. 3) insofar as the timing of successive cut cycles for preset cut-lengths and the control over each cut cycle of the present rotary shear are concerned.

The casing 140 of the planetary differential 132 has an arm 178 (see also FIG. 9) which at 180 is pivotally connected with a follower strap 182 on an eccentric 184 on a shaft 186 which through a clutch 188 is connectible with and disconnectible from a shaft 190. Shaft 190 carries a gear 192 which through an idler gear 194 is drivingly connected with gear 146. The gears 146 and 192 are of identical size, wherefore they are driven at a one-to-one ratio, also they are driven in the same direction owing to their driving connection through the intermediate gear 194.

The shaft 186, which carries the eccentric 184, has splined thereto the driven member 196 of a clutch 198 of which the other member 200 is immovably mounted on a fixed part 202 of the shear.

In operation of the shear, and assuming that the eccentric 184 is locked against rotation in the position shown in FIG. 9 by disengaging clutch 188 and engaging clutch 198 (FIG. 8), a single cut cycle will take place on engagement of the pneumatic clutch 154 as caused by the control device 170. Thus, with the gears 148 and 146 being also of identical size, the shear drums 122 and 124 will, during the single revolution of the main shaft 150, be driven through a single revolution through intermediation of gears 148, 146, shaft 144, planetary differential 132 with its then locked casing 140, and clutch 128. The shear drums 122, 124 will thus be turned through one revolution at uniform speed on operation of the drive motor 160 at uniform speed, with the stock $s$ being fed at the peripheral speed of the shear blades 126 so as to be in synchronism with the latter at the time of cut. The operation of the shear as just described corresponds to the operation of the earlier described shear 10 according to FIG. 4, in that the present shear is conditioned for a minimum cut-length which is intermediate larger and smaller minimum cut-lengths for which the shear may be conditioned.

For operation of the shear for the smallest minimum cut-length, clutch 198 is disengaged for the release of the eccentric 184 for its power drive, and while the eccentric 184 is in the position in FIG. 9 in idle condition of the shear, clutch 188 is engaged for the power drive of this eccentric during each cut cycle. Thus, with the assumed normal drive direction of the sun gear 134a and eccentric 184 being clockwise as indicated by the full-line and dot-and-dash line arrows 204 and 206 (FIG. 9), the eccentric 184 will, at the time of cut pass through a position 180 degrees displaced from that shown, meaning that the same will then turn the casing 140 and planetary gears 138 clockwise at maximum speed. With the other sun gear 134b being inherently driven in a direction opposite to the sun gear 134a, i.e., anticlockwise as indicated by the arrow 208 (FIG. 9), it stands to reason that clockwise rotation of the casing 140 and planetary gears 183 by the eccentric 184 at maximum speed at the time of cut will have the effect of maximum deceleration at that time of the sun gear 134b and, hence, of the shear drums. Thus, it is at the times of cut that the rotary speed of the shear drums is at a minimum, requiring a correspondingly low rate of feed of the stock for synchronous movement of the latter and of the shear blades at the times of cut, and this accounts for the smallest minimum cut-length of which the shear is capable.

To operate the shear for the largest minimum cut-length, the eccentric 184 is, in idle condition of the shear and on disengagement of the clutches 198 and 188, adjusted to a position 180 degrees displaced from that shown in FIG. 9, whereupon clutch 188 is reengaged. With the shear thus conditioned, the eccentric 184 will, at the time of cut, pass through the position in FIG. 9 and, hence, then turn the casing 140 and planetary gears anticlockwise at maximum speed, resulting in maximum acceleration of the sun gear 134b and, hence, of the shear drums at the time of cut. Thus, it is at the times of cut that the rotary speed of the shear drums is at a maximum, requiring a correspondingly high rate of feed of the stock for synchronous movement of the latter and of the shear blades at the times of cut, and this accounts for the largest minimum cut-length of which the shear is capable.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. Apparatus for cutting stock in motion, comprising a shear having companion shear blades, and mechanism with first and second turnable means operative during each revolution of said first means cyclically to move said blades once into and from shearing relation with each other and also in the direction of moving stock at the time of cut, and operative on turning movement of said second means in opposite directions at the time of cut to increase and decrease the speed of said blades in said direction, respectively; power means including a clutch for driving said first means on clutch engagement; a device measuring the length of stock advanced to said blades, said device being presettable for different cut-lengths and operative on measuring the corresponding advanced stock length to engage said clutch; means to disengage said clutch upon completion of a cycle of said blades; and other mechanism to operate said shear for two different minimum cut-lengths at the same speed of said first means, comprising an eccentric operatively connected with said second means, another clutch having companion members, of which one member is driven from said power means at a one-to-one ratio with said first means, and the other member turns with said eccentric, and said eccentric being on disengagement of said other clutch adjustable into either one of two different angular positions in which on reengagement of said other clutch and drive of said eccentric the latter will turn said second means in opposite directions, respectively, at the times of cut.

2. Apparatus for cutting stock in motion as set forth in claim 1, in which said positions of said eccentric are such that the latter will turn said second means at maximum speed at the times of cut.

3. Apparatus for cutting stock in motion as set forth in claim 1, in which said other mechanism further comprises means for releasably locking said eccentric against rotation when said other clutch is disengaged, whereby to operate the shear for an additional minimum cut-length between said two minimum cut-lengths.

4. Apparatus for cutting stock in motion, comprising a shear with a drive shaft having operating eccentrics, a frame and a gate carrying companion shear blades, respectively, of which said frame is turnable on one of said eccentrics and said gate is operatively connected with the other eccentric and guided on said frame so that said blades cyclically reciprocate once into and from cutting relation with each other on each revolution of said shaft, and an arm pivotally mounted at one end and having at its other end a pivot connection with said frame so that said one eccentric will on each revolution impart one back and forth oscillation to said frame and gate about said pivot connection; power means including a clutch for driving said shaft on clutch engagement; a device measuring the length of stock advanced to said shear, said device being presettable for different cut-lengths and operative on measuring the corresponding advanced stock length to engage said clutch; means to disengage said clutch upon completion of a cycle of said blades; and mechanism to operate the shear for either of two different minimum cut-lengths at the same speed of said shaft, comprising a third eccentric serving as said pivot mount for said arm, another clutch having companion members of which one member is driven from said shaft at a one-to-one ratio and the other member turns with said third eccentric, and said third eccentric being on disengagement of said other clutch adjustable into either one of two different angular positions in which on reengagement of said other clutch and drive of said third eccentric the latter will impart to said frame and gate superimposed oscillations about said one eccentric which respectively are additive to and subtractive from the oscillations imparted by said one eccentric.

5. Apparatus for cutting stock in motion as set forth in claim 4, in which the axes of said third eccentric and pivot connection are parallel to said shaft and in idle condition of the shear lie in a plane normal to another plane in which the axes of said shaft and pivot connection lie.

6. Apparatus for cutting stock in motion as set forth in claim 5, in which in said angular positions of said third eccentric the latter extends with its largest radius parallel to said other plane but in opposite directions, respectively.

7. Apparatus for cutting stock in motion as set forth in claim 6, in which said mechanism further comprises means for releasably locking said third eccentric in either of said angular positions against rotation when said other clutch is disengaged, whereby to operate the shear for an additional minimum cut-length midway between said two minimum cut-lengths.

8. Apparatus for cutting stock in motion, comprising a rotary shear having drivingly interconnected drums carrying companion shear blades with a cutting cycle for each drum revolution; mechanism to operate the shear for either of two different minimum cut-lengths comprising power means, first and second clutches having companion members, a planetary differential with sun and planetary gears and a rotary casing carrying said planetary gears, of which said sun gears are drivingly connected with one member of said clutches, respectively, an eccentric operatively connected with said casing, and a third clutch with first and second companion members of which said first member is driven from said one member of said first clutch at a one-to-one ratio and said second member turns with said eccentric, and said eccentric being on disengagement of said second and third clutches adjustable into two different angular positions in which on reengagement of said second and third clutches and drive of said eccentric the latter will turn said casing in opposite directions, respectively, at the times of cut; a device measuring the length of stock advanced to the shear, said device being presettable for different cut-lengths and operative on measuring the corresponding advanced stock length to engage said first clutch; and means to disengage said first clutch upon completion of a cutting cycle of said blades.

9. Apparatus for cutting stock in motion as set forth in claim 8, in which said eccentric is connected with said casing by a follower arm having a pivot connection with said casing, and the axes of said eccentric and pivot connection are parallel to the common axis of said sun gears and in idle condition of the shear lie in a plane normal to another plane in which the axes of said sun gears and pivot connection lie.

10. Apparatus for cutting stock in motion as set forth in claim 9, in which in either of said angular positions of said eccentric the latter extends with its largest radius parallel to said other plane.

11. Apparatus for cutting stock in motion as set forth in claim 10, in which said mechanism further comprises means for releasably locking said eccentric in either of said angular positions against rotation when said third clutch is disengaged, whereby to operate the shear for an additional minimum cut-length between said two minimum cut-lengths.

References Cited
UNITED STATES PATENTS 2,843,202    7/1958    Hallden _____ 83—299

ANDREW R. JUHASZ, *Primary Examiner.*